United States Patent [19]
Kalven

[11] 3,708,058
[45] Jan. 2, 1973

[54] VACUUM BELT CONVEYOR
[75] Inventor: Alex E. Kalven, Somerville, N.J.
[73] Assignee: GAF Corporation, New York, N.Y.
[22] Filed: Jan. 8, 1971
[21] Appl. No.: 104,971

Related U.S. Application Data

[63] Continuation-in-part of Ser. No. 863,138, Oct. 2, 1969, Pat. No. 3,608,895.

[52] U.S. Cl...................................198/184, 271/74
[51] Int. Cl............................................B65g 15/00
[58] Field of Search........198/179, 180, 184; 271/74, 271/26 ES

[56] References Cited
UNITED STATES PATENTS 3,545,631  12/1970  Mojden et al......................271/74 X
3,477,558  11/1969  Fleischauer.........................198/184

Primary Examiner—Evon C. Blunk
Assistant Examiner—Douglas D. Watts
Attorney—Walter C. Kehm and Samson B. Leavitt

[57] ABSTRACT

Flat objects are conveyed by the under surface of a springy layer on a continuous belt which moves in contact with the smooth bottom surface of a vacuum plenum chamber having an elongated slot opening to the center of the belt which has a series of perforations each corresponding to an enlarged hole in the springy layer that grips each flat object under the vacuum influence of the plenum chamber.

1 Claim, 3 Drawing Figures

PATENTED JAN 2 1973  3,708,058

INVENTOR.
BY ALEX E. KALVEN
Martin Smolowitz
ATTORNEY

VACUUM BELT CONVEYOR

This invention relates to vacuum belt conveyors, and is a continuation-in-part of my application Ser. No. 863,138 filed Oct. 2, 1969, now U.S. Pat. No. 3,608,895.

According to the present invention the efficiency of the vacuum conveyor of the system for handling tile in such application is substantially improved by the provision of a vacuum plenum chamber having a bottom wall in which a single central slot extends longitudinally thereof, and is flanked by perforations in two rows. A novel continuous belt runs under and in contact with the smooth undersurface of the plenum chamber. Such belt consists of a base composed of fiber reinforced rubber having a series of perforations which communicate with such slot and a sponge-rubber outer layer having a relatively large hole corresponding to each perforation in the belt, for vacuum gripping each flat tile carried by the conveyor firmly, yet effectively, and without damage to the tile surface. At the same time, air leakage in the system is substantially reduced.

Figure 1:
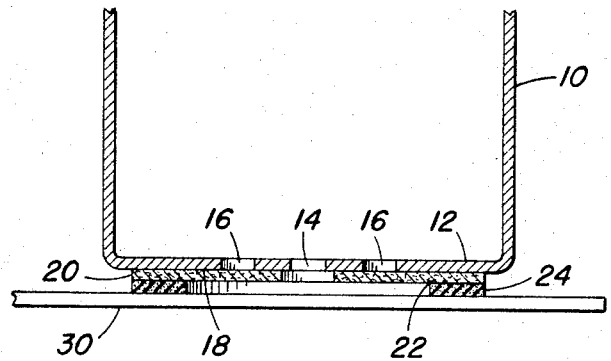
FIG. 1 is a fragmentary view and cross section of a vacuum conveyor belt illustrative of the invention.
Figure 2:
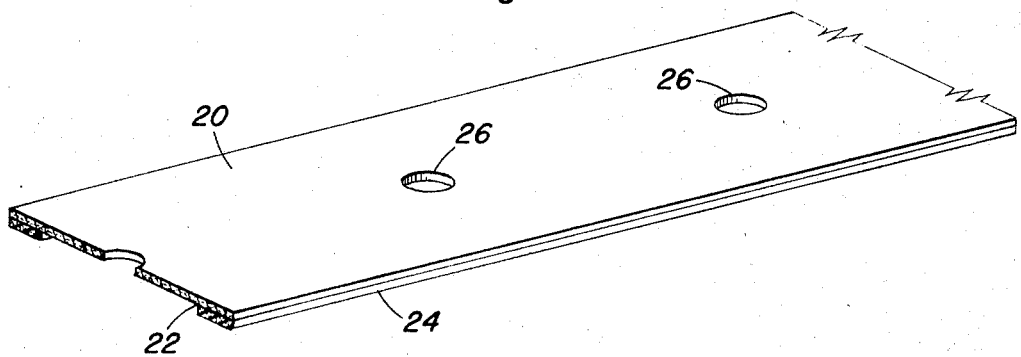
FIG. 2 is a fragmentary perspective view of the belt.
Figure 3:
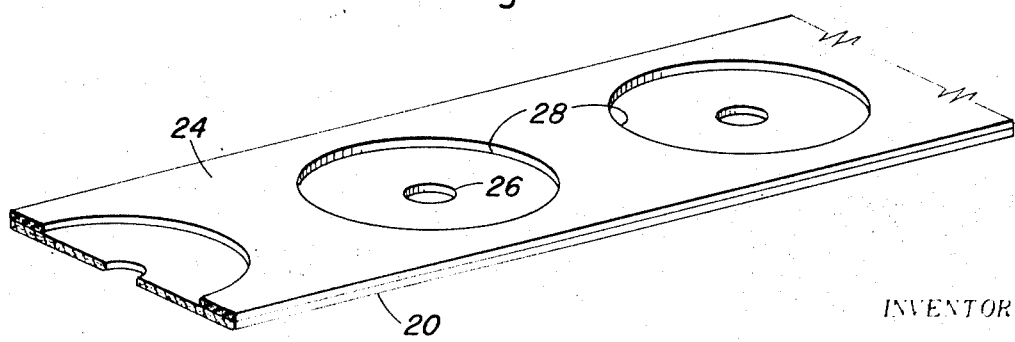
FIG. 3 is a similar view of the belt turned upside down.

As shown in FIG. 1 a vacuum plenum chamber 10 comprises a bottom panel 12 having a central longitudinal slot 14 flanked by a row of perforations 16 on each side thereof. Running under the smooth undersurface 18 of the panel 12 is the corresponding reach of a continuous belt 20. The base 22 of belt 20 is composed of fiber reinforced rubber. Such base 22 carries a layer 24 of spongy matter such as closed-cell sponge rubber cemented thereto. The base 22 of the belt 20 is provided with a series of perforations 26 underlying the slot 14, and each perforation 22 is surrounded by a corresponding larger hole or recess 28 in the layer 24, there being one hole and recess for each tile 30.

The base belt is perforated at equal intervals with 5/16 inch holes and rides against the plenum which is reduced to a slot about one-fourth inch wide and continuous over the area where vacuum support is required plus perforations to support the belt and object. The top layer is perforated with large holes, 1⅜ inch in diameter, and is laminated to the base belt by means of an adhesive. The large perforations are centered over the small holes in the base belt. The combination creates an endless series of suction cups where the sponge rubber provide the sealing medium between the object and the belt. The belt itself is held tight against the plenum as the leakage path has been increased from the edge of the belt to the slot. By having fewer holes in the belt the leakage between objects on the belt has been reduced. The holding force on the object has been increased as it is directly proportional to the large hole in the top layer. The sponge rubber also conforms itself to any small irregularities that might affect good sealing between object and belt and reduces leakage to a minimum.

The configurations of the cutouts on the layer can take any shape (circular-has been shown), the spacing of the holes, the size of the holes and the width, thickness and material of the belt can be varied at random to suit any particular application.

The efficiency with which a vacuum belt can support flat objects depends on several factors as follows:

1. Leakage of air between the belt and the vacuum plenum.
2. Leakage of air between the object supported and the belt.
3. Leakage of air through the perforations in the spaces between objects being transported.

The invention minimizes the air leakage in cases 1 and 2 above and reduces the leakage in case 3, as it can never be completely eliminated since the system has to operate occasionally even when there are no objects on the belt and all perforations are open to the air.

What is claimed is:

1. An improved conveyor apparatus combination for handling an article such as a floor tile including: a vacuum plenum chamber having a bottom wall provided with a single central slot extending longitudily thereof, being surrounded by several rows of perforations; a conveyor belt having perforations disposed at equal intervals located directly under such slot, being in contact with a smooth under surface of said plenum chamber, the improvement comprises providing said belt with a base material compound of fiber reinforced rubber having a series of perforations about five-sixteenth inch in diameter, adapted to communicate with said slot; and a layer of closed cell spongy material laminated to the top of said belt on the outer surface thereof: said spongy material having holes concentric to those of said belt and about 1⅜ inch in diameter; whereby the combination creates an endless series of suction cups, the top layer of which forms the sealing medium between a floor tile and said conveyor belt.

* * * * *